3,528,780
VISUAL AMMONIA DETECTOR
James L. Radawski, Belmont Shores, Calif., assignor to the United States of America as represented by the Secretary of the Air Force
No Drawing. Filed Apr. 5, 1968, Ser. No. 719,223
Int. Cl. G01n 31/22
U.S. Cl. 23—253                                   1 Claim

ABSTRACT OF THE DISCLOSURE

A composition for visually detection the leakage of ammonia fumes which comprises polyvinyl alcohol, water and a suitable indicator with or without the addition of silica gel and glycerine. Suitable indicators include phenolphthalein and an equal mixture of cresol red and thymol blue. The composition is a hygroscopic, water soluble emulsion which can be applied to any surface in the same manner as paint by spraying, brushing or dipping. In order to be operative, the detector does not require water beyond atmospheric or chemically bound moisture and is regenerative to its original color even after exposure to ammonia fumes. Upon application to a suitable surface, the composition assumes a yellow color in an ammonia free atmosphere, but changes color to red with a phenolphthalein indicator and to blue with a cresol red-thymol blue indicator upon exposure to ammonia fumes.

BACKGROUND OF THE INVENTION

This invention relates to a means for detecting ammonia vapors. More specifically, this invention concerns itself with a paint-like composition designed to be applied to a substrate for the purpose of visually detecting the leakage of ammonia fumes from apparatus and systems which utilize ammonia as a heat exchange medium.

The utilization of ammonia heat exchanger systems for cooling the component parts of re-entry vehicles, such as missiles, has found wide application in the aerospace field. Ammonia is an especially good heat exchange medium because it has high heat of vaporization and is liquified with relative ease. Although ammonia systems exhibit a very desirable high heat transfer rate per unit weight, there is a serious drawback in using these systems because of the highly corrosive nature of anhydrous ammonia. The prevention of corrosion damage due to ammonia leakage, therefore, has become a problem of paramount concern. Corrosion damage to the component parts of a missile system vehicle can be minimized to some degree by proper preventive maintenance. However, because of limited accessibility to the heat exchange system, it is not always feasible to practice good preventive maintenance. In such cases, where limited maintenance presents a problem, it was found that a visual, replaceable indicator capable of detecting ammonia vapors in concentrations of about 100 parts per million or less would overcome the serious drawback inherent in utilizing an ammonia heat exchange system.

SUMMARY OF THE INVENTION

In accordance with the present invention, it has been found that a visual, replaceable ammonia indicator suitable for detecting the leakage of ammonia vapors in concentrations of about 100 parts per million can be formulated from an indicator system containing a polyvinyl alcohol polymeric film which exhibits a color change upon exposure to ammonia fumes. The system is hygroscopic and capable of functioning under the environmental conditions prevalent during the operation of a re-entry vehicle. The polymeric film after application is rigid and holds the dispersed indicator; rather than the indicator being suspended within an inert base, such as alumina or paper, as was done with prior art detection systems. The detector composition is a water soluble emulsion which can be applied to any surface, like a paint. It is regenerative, and since the film base is formed with polyvinyl alcohol, it is permeable only to water vapor and ammonia.

Accordingly, the primary object of this invention is to circumvent the problems encountered in using ammonia type heat exchangers by providing a simple and regenerative system for detecting ammonia vapors.

Another object of this invention is to provide a visual, replaceable detection composition which forms a rigid film subsequent to its application to the surface of a substrate material.

Still another object of this invention is to provide a detector composition which is capable of functioning under the environmental conditions encountered during the operation of a missile system.

A further object of this invention is to provide a detector composition having a sensitivity to ammonia of 100 parts per million or less.

Still a further object of this invention is to provide a detector composition which possesses a paint-like consistency that can be applied to the surfaces of a substrate material and, when set, forms a rigid film that changes color to indicate the leakage of ammonia vapors.

Still further objects and advantages of this invention will become apparent as the description thereof proceeds.

DESCRIPTION OF THE PREFERRED EMBODIMENTS

This invention provides a system for detecting the leakage of ammonia fumes in concentrations of 100 parts per million or less of ammonia. The system constitutes a paint-like water soluble emulsion composed of a mixture of water, an ammonia indicator and a polyvinyl alcohol polymeric film forming material.

In general, the compositions of the invention can be formulated from about 10%–25% by weight polyvinyl alcohol; 0%–2% by weight silica gel; 0%–10% by weight glycerine; 75%–90% by weight water and from 0.1–0.5% by weight of a suitable indicator.

Upon application to a suitable surface, the emulsion forms a rigid film which is hygroscopic and regenerative in nature. The film is hygroscopic to a degree which can be controlled by using glycerine as a plasticizer. Finely ground silica gel may also be added to the formulation to take full advantage of atmospheric humidity. A mixed indicator, thymol blue and cresol red, has proven to be an optimum indicator because of the sharp color contrast. Other indicators such as those shown in Table 1 may also be used. The final composition of the invention does not readily separate on standing, does not foam excessively, can be brushed, dipped or sprayed onto the surface of the desired item and forms a bright yellow film on drying. Upon exposure to ammonia, the film assumes a different color depending on the particular indicator used as a component of the composition.

The following examples are presented to illustrate the invention in a more detailed manner. The percentages are by weight unless otherwise indicated.

EXAMPLE 1

|  | Percent |
|---|---|
| Polyvinyl alcohol | 8.0 |
| Indicator (equal mixture of cresol red-thymol blue) | 0.2 |
| Glycerine | 1.8 |
| Silica gel | 1.0 |
| Water | 8.9 |

EXAMPLE 2

|  | |
|---|---|
| Polyvinyl alcohol | 14.8 |
| Indicator (equal mixture of cresol red-thymol blue) | 0.2 |
| Water | 85.0 |

EXAMPLE 3

|  | |
|---|---|
| Polyvinyl alcohol | 14.8 |
| Indicator (phenolpthalein) | 0.2 |
| Water | 85.0 |

The polyvinyl alcohol, silica gel and indicator in dry powdered form are mixed together in a mortar or ball mill. The dry mixture is then placed in a convenient container. Hot water, heated to a temperature of about 80°–90° is added in small amounts to facilitate dissolving the dry ingredients. The glycerine is then added to the solution and allowed to cool to room temperature. After standing for two to three hours, the solution is ready for application to a suitable surface.

Test results on the ammonia sensitivity of the detector composition of this invention and on commercial indicators are shown in Table I. Also shown are test results on the polymeric film base formulations similar to those in Examples 1, 2 and 3 except that polyvinyl acetate and methyl cellulose were employed as the film forming component rather than polyvinyl alcohol.

An examination of the test results disclosed in Table I, clearly shows that polyvinyl alcohol, as the polymeric film base component, provides optimum results. Methyl cellulose, as a film former, also possesses a degree of sensitivity for ammonia. However, methyl cellulose, as a film, is not completely desirable because it dries out on aging and its sensitivity decreases to 500 p.p.m.

The first set of test samples 1 through 5 in Table I were all solid or paper indicators. The test coupons were one-half inch square. The coupons were placed on small strips of tape and affixed to a paper cross. The solid indicators were prepared simply by mixing the solid with the desired indicator system. The solution was then allowed to evaporate to dryness. The indicator was deposited on the solid in this manner. The filter papers systems were prepared by immersing a piece of No. 40 filter paper in the desired indicator system, and the paper was allowed to dry in the open. The polymer film systems from the second set of samples 6, 7 and 8 were prepared by dipping a glass microscope slide into a beaker of the material. The excess polymer was wiped off the back and edges of the slide with a paper towel and then allowed to dry in the open atmosphere.

The test samples, after preparation, were introduced into a test chamber of conventional design. The chamber was then connected to an ammonia gas system. Ammonia gas was then introduced into the chamber in very carefully measured amounts. Thus, the time for color change was obtained for a definite ammonia concentration.

From a consideration of the foregoing, it can be seen that the present invention provides a visual, replaceable, regenerative ammonia detecting composition which is capable of operating within an aerospace environment. The composition forms a stable emulsion that adheres to almost any surface and dries to a rigid film. The resultant film is permeable only to water and ammonia vapors and

TABLE I.—AMMONIA INDICATOR TEST RESULTS

| Sample | $NH_4OH$ screen test | 1,000 p.p.m. anhydrous $NH_3$ | Reaction time (min.) 1,000 p.p.m. | Final color 1,000 p.p.m. | 500 p.p.m. anhydrous $NH_3$ | Reaction time (min.) at 500 p.p.m. | Final color at 500 p.p.m. | 100 p.p.m. anhydrous $NH_3$ | Reaction time (min.) at 100 p.p.m. | Final color at 100 p.p.m. |
|---|---|---|---|---|---|---|---|---|---|---|
| 1. Humidial | x | — | — | — | — | — | — | — | — | — |
| 2. Pyrodyne P/N 10 | x | x | 80 | LP | — | — | — | — | — | — |
| 3. Phenolphthalein: | | | | | | | | | | |
| a. Alumina | x | — | — | — | — | — | — | — | — | — |
| b. Filter paper | x | — | — | — | — | — | — | — | — | — |
| c. Silica gel | x | x | 150 | LP | — | — | — | — | — | — |
| 4. Thymol blue: | | | | | | | | | | |
| a. Alumina | x | — | — | — | — | — | — | — | — | — |
| b. Filter paper | x | — | — | — | — | — | — | — | — | — |
| c. Silica gel | x | — | — | — | — | — | — | — | — | — |
| 5. Mercuric chloride: | | | | | | | | | | |
| a. Alumina | x | — | — | — | — | — | — | — | — | — |
| b. Filter paper | x | — | — | — | — | — | — | — | — | — |
| c. Silica gel | x | — | — | — | — | — | — | — | — | — |
| 6. Methyl cellulose base: | | | | | | | | | | |
| a. Phenolphthalein | x | x | 30 | LR | — | — | — | — | — | — |
| b. Thymol blue | x | x | 30 | LB | — | — | — | — | — | — |
| c. Cresol red-thymol blue | x | x | 25 | LV | — | — | — | — | — | — |
| d. Phenolphthalein-methyl green | — | — | — | — | — | — | — | — | — | — |
| e. Phenolphthalein-methyl green (modified w/methylene blue chloride) | — | — | — | — | — | — | — | — | — | — |
| 7. Detector Composition from: | | | | | | | | | | |
| Example 3. Phenolphthalein | x | x | 20 | R | x | 45 | LR | — | — | — |
| Example 2. Cresol red-thymol blue | x | x | 20 | V | x | 45 | LV | — | — | — |
| Example 1. Cresol red-thymol blue | x | x | 15 | V | x | 15 | V | x | 20 | LV |
| 8. Polyvinyl acetate base: | | | | | | | | | | |
| a. Thymol blue | — | — | — | — | — | — | — | — | — | — |
| b. Cresol red-thymol blue | — | — | — | — | — | — | — | — | — | — |

LP=light pink. LB=light blue. LR=light red. LV=light violet. R=red. V=violet. x Denotes positive reaction. — Denotes no reaction.

possesses a sensitivity on the order of 100 parts per million of ammonia. It does not lose this sensitivity on exposure to sunlight and exhibits a shelf life of better than six months.

While the invention has been described with particularity in reference to specific embodiments thereof, it is to be clearly understood that the disclosure of the present invention is for the purpose of illustration only and is not intended to limit the invention in any way, the scope of which is defined by the appended claim.

What is claimed is:

1. A water based emulsion for application to the surface of a substrate material and adapted when dry to detect the leakage of ammonia vapors consisting essentially of about 8.0% by weight polyvinyl alcohol, 89.0% by weight water, 1.8% by weight glycerine, 1.0% by weight silica gel and 0.2% of a cresol red-thymol blue indicator.

References Cited

UNITED STATES PATENTS

| | | |
|---|---|---|
| 3,016,292 | 1/1962 | Bauer et al. |
| 3,238,020 | 3/1966 | Eiseman. |

FOREIGN PATENTS

| | | |
|---|---|---|
| 922,606 | 4/1963 | Great Britain. |

OTHER REFERENCES

Merck Index, 7th edition, Merck & Co. Inc., 1960 pp. 1566 and 1568 relied on.

MORRIS O. WOLK, Primary Examiner

R. M. REESE, Assistant Examiner

U.S. Cl. X.R.

23—232; 252—408